Patented May 22, 1951

2,554,186

UNITED STATES PATENT OFFICE 2,554,186

PARA-AMINO HYDROXYBENZAMIDES

Alan August Goldberg, Hampstead, London, and Harold Augustus Walker, Croscombe, near Wells, England, assignors to Ward Blenkinsop & Company Limited, London, England, a British company No Drawing. Application March 6, 1950, Serial No. 148,002. In Great Britain March 10, 1949

8 Claims. (Cl. 260—250)

This invention is for substituted 4-amino hydroxybenzamides which are substances of pharmacological interest.

The present invention provides substituted 4-amino-hydroxybenzamides having the general formula:

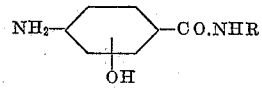

in which R is a monocyclic heterocyclic residue containing at least one but not more than two nuclear nitrogen atoms and having a carbon atom in the 2-position which is directly attached to the nitrogen atom of the amido group.

More especially the invention provides the said benzamides in which the hydroxyl group is in the ortho position with respect to the substituted carbonamido group i. e. amido-substituted 4-amino-salicylamides.

The invention also provides a method of producing the aforesaid compounds which comprises reducing a compound having the general formula

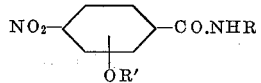

in which R is as above defined and R' is a hydrogen atom, an alkali metal or an acyloxy group, under substantially neutral conditions.

The group R in the said para-substituted hydroxy benzamides may be a pyridine, pyrimidine, pyrazine or pyridazine group and, in addition to containing one or two nuclear nitrogen atoms, it may also contain as a further member of the heterocyclic nucleus a sulphur atom i. e. it may be a thiazole or thiodiazole residue. The monocyclic heterocyclic nucleus is linked to the amido nitrogen atom by a carbon atom in the 2-position: thus the residue may be a 2-pyridine, 2-pyrimidine, 2-pyrazine or 2-thiazole residue.

The 4-nitrohydroxybenzamides and the 4-nitro acyloxybenzamides from which the present compounds may be produced are made by the interaction of the 4-nitro-acyloxy halides such as 4-nitro acetyl salicylyl chloride with monocyclic heterocyclic 2-amines, such as 2-aminopyridine, 2-aminothiazole, 2-amino-4-methylthiazole, 2-aminopyrimidine, 2-amino-4.6-dimethylpyrimidine, 2-aminopyrazine, 2-amino-1.3.4-thiadiazole and 2-amino-5-methyl-1.3.4-thiadiazole, in the presence of an acid acceptor. The acid acceptor may be an excess of the 2-amine or any other substance which under the reaction conditions will not bring about appreciable hydrolysis of the substituted 4-nitro-acyloxybenzamide such as pyridine, quinoline, thiazole and their homologues and aromatic amines such as aniline and dimethylaniline. Preferably a water-miscible organic base is employed. The reaction usually goes quite quickly but heating may be applied especially to complete the reaction expeditiously. Preferably at least one of the reactants is present in solution. The product often separates and can, in any event, be isolated by pouring the reaction mixture into water.

Conversion of the substituted 4-nitroacyloxybenzamide to the corresponding 4-aminohydroxybenzamide involves reduction of the nitro group and hydrolysis of the acyl group. The two steps may be carried out successively or simultaneously. In the two step process hydrolysis may be carried out using a mild alkali such as sodium or potassium carbonates followed by acidification to a pH of about 5. The product may be collected, dissolved in a volatile organic solvent such as methanol or ethanol, and subjected to catalytic hydrogenation using as catalyst a group VIII metal.

However, the compounds of the present invention are most conveniently prepared directly from the corresponding substituted 4-nitroacyloxybenzamides. Reduction and hydrolysis can be carried out simultaneously under mildly alkaline conditions. Thus a suspension of the nitroacyloxybenzamide may be treated with a slight excess of alkali and the reaction mixture hydrogenated. Good results have been obtained in the presence of the hydrogenating metals of group VIII such as palladium, platinum, and Raney nickel: the latter being preferred. The free compounds may be liberated by addition of sufficient mineral acid to react with the alkali salts of the phenolic hydroxyl group (pH about 5). Elevated temperatures and/or pressures can be used in carrying out the catalytic hydrogenation.

The products have useful pharmacological properties some being of especial interest on account of their tuberculostatic properties: they are also valuable intermediates.

The following examples illustrate the invention:

EXAMPLE 1

A solution of 366 g. of 4-nitrosalicylic acid in 800 cc. of acetyl chloride is refluxed for 6 hours. The product is cooled, 800 cc. of thionyl chloride added and the mixture refluxed for a further 6 hours. The excess of acetyl and thionyl chlorides are removed under reduced pressure, an excess of dry benzene added and this then removed under reduced pressure at 40° C. in order to remove the last traces of the acetyl and thionyl chlorides. The residual oil of 4-nitro-2-acetoxy benzoyl chloride (480 g.), which rapidly crystallises to a pale yellow solid, is added portionwise to 450 gms. of solid 2-aminopyridine in a mechanically driven mixing machine at such a speed that the temperature does not exceed 70° C. The product rapidly melts to a viscous fluid which is well mixed for 1 hour. This is cooled and deacetylated by warming with 10 litres of 2% aqueous sodium carbonate solution for 6 hours. After cooling the bright yellow granular 2-(4-nitro-2-hydroxybenzamido) pyridine is collected. The yield is 450 g., M. P. 263° C. It may be purified by recrystallisation from dilute pyridine and obtained in yellow needles M. P. 268° C. (Found: N, 16.5%; $C_{12}H_9O_4N_3$ requires N, 16.2%.)

The foregoing nitro compound (350 g.) is dissolved in 10 litres of alcohol and shaken with a palladium-charcoal catalyst in an atmosphere of hydrogen at 60 lbs. per square inch pressure and at about 60° C. until the requisite amount of hydrogen has been absorbed. (The catalyst is prepared by reducing a suspension of 50 g. of charcoal in a solution of 10 g. of palladium chloride with hydrogen). The filtered solution is concentrated to small volume at reduced pressure and allowed to stand on ice: 2-(4-amino-2-hydroxybenzamido)pyridine separates as a pale buff coloured granular solid (300 g.) M. P. 170° C. with decomposition. Found: N, 18.2%; $C_{12}H_{11}O_2N_3$ requires N, 18.3%.

EXAMPLE 2

*2-(4-aminosalicylamido) 4:6-dimethyl pyrimidine*

9.6 parts of 4-nitro-2-acetoxy benzoyl chloride is added to a solution of 4.9 parts of 2-amino-4:6-dimethyl pyrimidine in 10 parts of dry pyridine at such a speed that the temperature does not rise above 60° C. After standing for several hours the solution is poured into water and the brown solid precipitate (M. P. 80° C., 9.5 parts) collected. This is hydrolysed by dissolving in warm dilute sodium carbonate solution and then precipitating at pH 5 with dilute hydrochloric acid. After repeating this process the fawn precipitate of 2-(4-nitrosalicylamido) 4:6-dimethyl pyrimidine (7.0 parts; M. P. 230° C.) is collected, dissolved in 700 parts of methyl alcohol and shaken with hydrogen at substantially 60° C. in the presence of 2 parts of a 10% palladium charcoal catalyst until the theoretical amount of hydrogen has been consumed. The solution is cooled, filtered and the filtrate evaporated to dryness at reduced pressure. The 2-(4-aminosalicylamido) 4:6-dimethyl pyrimidine thus obtained (4.5 parts) is a yellow crystalline powder M. P. 210° C. with decomposition. It is very soluble in alcohol and almost insoluble in water. (Found: N, 21.7%; $C_{13}H_{14}O_2N_4$ requires N, 21.6%.)

EXAMPLE 3

A solution of 48 parts of 4-nitro-2-acetoxybenzoyl chloride in 200 parts of dry acetone is refluxed for 2 hours with a solution of 51 parts of 2-amino-4:6-dimethyl pyrimidine in 500 parts of dry acetone. The hydrochloride of 2-amino-4:6-dimethyl pyrimidine is filtered off and recovered (23 parts) and the filtrate evaporated to dryness at reduced pressure. The residual oily product is hydrolysed by dissolving in warm aqueous alcoholic sodium carbonate and then precipitating the 2-(4-nitrosalicylamido) 4:6-dimethyl pyrimidine (36 parts) by acidifying to pH 5 with dilute hydrochloric acid. Reduction of this with hydrogen over a palladium catalyst in the same manner as described in Example 2 yields 2-(4-aminosalicylamido)-4:6-dimethyl pyrimidine in high yield.

EXAMPLE 4

A solution of 10 parts of 2-(4-nitro-2-acetoxy benzamido)-4:6-dimethyl pyrimidine in alcohol is shaken with hydrogen for several hours in the presence of a palladium charcoal catalyst at 60° C. The catalyst is removed by filtration, aqueous sodium carbonate added and the solution warmed for a short time. The solution is cooled, neutralised with dilute hydrochloric acid, evaporated to dryness and the residue extracted with absolute alcohol. Evaporation of the alcoholic extract yields the 2-(4-amino-salicylamido) 4:6-dimethyl pyrimidine M. P. 156° C. in high yield.

EXAMPLE 5

24 parts of 4-nitro-2-acetoxy benzoyl chloride is added portionwise to a solution of 10 parts of 2-aminothiazole in 40 parts of dry pyridine. The solution is allowed to stand several hours, diluted with water and heated on the water bath for 1 hour. On cooling, the 2-(4-nitrosalicylamido) thiazole separates in good yield M. P. 284° C. (Found N, 16.0; S, 12.0; $C_{10}H_7O_4N_3S$ requires N, 15.8; S, 12.1%.) Reduction of this nitro compound with hydrogen over a palladium catalyst in the same manner as described in Example 2 gives 2-(4-aminosalicylamido) thiazole as a microcrystalline powder.

EXAMPLE 6

*4-nitro acetylsalicylic acid*

A suspension of 4-nitrosalicylic acid in twice its weight of acetic anhydride containing a trace of concentrated sulphuric acid is warmed on the steam bath for 2 hours. On cooling the red solution, 4-nitro acetyl salicylic acid crystallises out; this is collected, stirred with a little dry ether, filtered off, washed with a little more ether and dried in vacuo. The yield of 4-nitro salicylic acid in the form of fine pale yellow needles, M. P. 157–158° C. is 95% of theory. (Found: N, 6.3%. $C_9H_7O_6N$ requires N, 6.25%.)

*4-nitro acetyl salicylyl chloride*

A suspension of 225 gm. of the foregoing acid (1.0 mol.) in 500 cc. of thionyl chloride and 500 cc. of benzene is refluxed for 6 hours, after which time excess reagent and solvent is removed from the red solution by vacuum distillation. 500 cc. of dry benzene is added to the residue, this again removed by distillation and the residue then heated to 110° C./10 mm. for ½ hour. The product is a light brown oil which rapidly crystallises to a fawn-coloured solid (220 g.; 90.5%) M. P. 86–88° C. Distillation (B. P. 158–160° C./1.8 mm.) affords a yellow oil, solidifying to a pale yellow crystalline solid, M. P. 93–94° C. (Found: N, 5.7; Cl, 14.6%. $C_9H_6O_5NCl$ requires: N, 5.76; Cl, 14.4%.)

*2-(4-nitrosalicylamido) pyridine*

125. g. of crude 4-nitro acetyl salicylyl chloride (0.5 mol.) is added portionwise to a solution of 60 gm. of 2-aminopyridine (0.6 mol.) in 250 c. c. of dry pyridine, keeping the temperature below 20°

C. After the addition the mixture is stirred at room temperature for 2 hours, heated on the steam bath for ½ hour and kept overnight. The reaction mixture is stirred with 5 litres of 0.2 N. sodium hydroxide for about 10 minutes and then acidified to pH 5.0 with 5 N. hydrochloric acid. The pale yellow precipitate (90 g., M. P. 248° C.) is collected and stirred with 500 cc. of alcohol and 40 cc. of 5 N. sodium hydroxide for ½ hour. 40 cc. of 5 N. of hydrochloric acid is added and the stirring continued for a further ¼ hour. The bright yellow crystalline precipitate of the amide which separates is collected, washed with water and dried in vacuo (65 g., 50%) M. P. 262–265° C. On recrystallisation from pyridine this is obtained in small, yellow prisms, M. P. 267–268° C. (Found: C, 55.7; H, 3.58; N, 16.5%. $C_{12}H_9O_4N_3$ requires C, 55.6; H. 3.48; N, 16.2%.)

2-(4-aminosalicylamido) pyridine

A suspension of 44 gm. of the foregoing nitro-compound (0.17 mol.) in 400 cc. of alcohol, 100 cc. of water and 34 cc. of 5 N. sodium hydroxide is hydrogenated at 1000 mm. of mercury pressure with a Raney nickel catalyst (about 25 g.) for 6 hours (hydrogen uptake, 11.2 litres; theory, 11.4 litres. After removing the catalyst, the filtrate is adjusted to pH 7.0 with dilute hydrochloric acid, evaporated to dryness and the residue twice recrystallised from alcohol to give glistening, yellow, flat needles (26 g.; 66.5%) M. P. 170–171° C. (Found: C, 62.0; H, 18.0. $C_{12}H_{11}O_2N_3$ requires: C, 63.0; H, 4.8; N, 18.3%.)

EXAMPLE 7

2-(4-nitrosalicylamido) thiazole 125 gm. of crude, dry 4-nitro acetyl salicylyl chloride (0.5 mol.) is added to a solution of 50 gm. of 2-aminothiazole (0.5 mol.) in 200 ccs. of pyridine keeping the temperature below 20° C.; yellow crystals separate before the addition is complete. After stirring 2 hours at room temperature and then for ½ hour on the steam bath the mixture is allowed to stand overnight. The yellow amorphous precipitate is collected, washed with water and dried (yield 100 g., M. P. 281° C.). Recrystallisation from pyridine gives small, bright yellow plates (75 g., 56.8%) of 2-(4-nitrosalicylamido) thiazole M. P. 284–285° C. (Found: N, 15.7; S, 12.0. $C_{10}H_7O_4N_3S$ requires N, 15.8; S, 12.1%.)

2-(4-aminosalicylamido) thiazole

A suspension of 26.5 gm. of nitro compound (0.1 mol.) in 500 cc. of alcohol, 100 cc. of water and 20 cc. of 5 N. sodium hydroxide is hydrogenated over a Raney nickel catalyst in the manner described in Example 6. The hydrogen uptake is 6660 c. c. in about 8 hours; the theoretical uptake is 6720 c. c. After removing the catalyst the filtrate is neutralised with hydrochloric acid and the precipitate of 2-(4-aminosalicylamido) thiazole (14 g.) collected. Recrystallisation from alcohol gives colourless microcrystals, M. P. 252–254° C. (Found: N, 17.9; S, 13.6. $C_{10}H_9O_2N_3S$ requires N, 17.85; S, 13.6%.)

EXAMPLE 8

2-(4-nitrosalicylamido)-5-methyl-1:3:4-thiadiazole 125 gm. of 4-nitroacetyl salicylyl chloride (0.5 mol.) is added to a solution of 60 gm. of 2-amino-5-methyl-1:3:4-thiadiazole (0.52 mol.) in 300 ccs. of dry pyridine at such a rate that the temperature does not exceed 20° C. After keeping for 2 hours at room temperature the reaction mixture is poured into water, the yellow precipitate filtered off, and washed with a little water. The precipitate is dissolved in 5 litres of water containing 200 cc. of 5 N. sodium hydroxide and the solution allowed to stand for 3 hours by which time fine red needles of the sodium salt separate. The suspension is stirred and neutralised with 200 cc. of 5 N. hydrochloric acid, the pale yellow microcrystalline precipitate (90 g.) collected and recrystallised from pyridine. The amide is obtained in pale yellow microcrystals (65 g.; 43%) M. P. 324–325° C. (Found: N, 20.1. $C_{10}H_8N_4O_4S$ requires N, 20.0%.)

2-(4-aminosalicylamido)-5-methyl-1:3:4-thiadiazole

A suspension of 70 gm. of the above nitro compound (0.25 mol.) in 800 cc. of water, 200 cc. of alcohol and 60 cc. of 5 N. sodium hydroxide is reduced with hydrogen over a Raney nickel catalyst (hydrogen uptake, in 8 hours is 16 litres; the theoretical uptake is 16.8 litres). The catalyst is removed, the solution treated with 60 cc. of 5 N. hydrochloric acid and the white, crystalline precipitate of 2-(4-aminosalicylamido)-5-methyl-1:3:4-thiadiazole collected. The yield is 50 g. (79.5%) M. P. 295–296° C. (Found: N, 22.6; S, 12.9. $C_{10}H_{10}N_4O_2S$ requires N, 22.4; S, 12.8%.) The compound crystallises from aqueous pyridine in white microcrystals M. P. 296–297° C. (Found: N, 22.5; S, 12.8%.)

EXAMPLE 9

2-(4-nitrosalicylamido) pyrazine 125 gm. of dry 4-nitro acetyl salicylyl chloride (0.5 mol.) is added to a solution of 50 gm. of 2-amino-pyrazine (0.52 mol.) in 300 cc. of dry pyridine keeping the temperature below 25°. After keeping for 2 hours, 20 cc. of water is added, the mixture heated on the steam bath for 15 minutes and then allowed to stand overnight. The small, yellow glistening plates of the amide (56 g.; M. P. 246° C.) which separate are filtered off, washed with water and recrystallised from the minimum amount of pyridine to give pale yellow, glistening plates. (40 g.; 31%) M. P. 269–270° C. (Found: C, 50.9; H, 3.1; N, 21.6. $C_{11}H_8O_4N_4$ requires C, 50.75; H, 3.08; N, 21.5%.)

2-(4-aminosalicylamido) pyrazine

A solution of 26 gm. of the foregoing nitro compound (0.1 mol.) in 600 cc. of alchool, 100 cc. of water and 20 cc. of 5 N. sodium hydroxide is reduced with hydrogen over Raney nickel in the manner described in Example 6 (hydrogen uptake, 7000 c. c.; theory, 6720 c. c.) After separation of the catalyst 20 cc. of 5 N. hydrochloric acid is added to the solution and the pale yellow, crystalline precipitate collected, washed with water and dried in vacuo (14 g.: 61%) M. P. 249–250° C. (Found: C, 57.6; H, 4.37; N, 24.5.)

$C_{11}H_{10}O_2N_4$ requires C, 57.5; H, 4.35; N, 24.35%.)

EXAMPLE 10

2-(4-nitrosalicylamido) pyrimidine 125 gm. of dry 4-nitro acetyl salicyl chloride (0.5 mol.) is added portionwise to 50 gm. of 2-amino-pyrimidine (0.52 mol.) dissolved in 250 cc. of pyridine maintaining the temperature below 25°. After standing for 2 hours, 50 cc. of water is added and the mixture heated on the steam bath for about ½ hour and the suspension diluted with 1 litre of water. The precipitate is collected and recrystallised from aqueous pyridine to yield 4-(2-nitrosalicylamido) pyrimidine (64 g.; 50%) M. P. 275–276° C. (Found: C, 48.5; H, 3.0; N, 21.4.)

$C_{11}H_8O_4N_4$ requires C, 50.75; H, 3.08; N, 21.5%.)

2-(4-aminosalicylamido) pyridine 20 gm. of the nitro compound (0.09 mol.) is dissolved in 500 cc. of alcohol, 100 cc. of water and 10 cc. of 5 N. sodium hydroxide and reduced with hydrogen over Raney nickel (hydrogen uptake, 6250 c. c.; theory, 6000 c. c.). After filtration, the solution is diluted with 500 cc. of water and acidified to pH 4.0 with dilute hydrochloric acid. The precipitate is collected, dissolved in 1 litre of warm water and 50 cc. of 5 N. hydrochloric acid, the solution filtered (charcoal), the filtrate treated with 5 N. sodium hydroxide until faintly alkaline and the amino compound precipitated by acidifying with dilute acetic acid. This is collected, washed with water and dried in vacuo. The yield is 10 g. (58%) M. P. 235–236° C. (Found: C, 53.5; H, 5.15; N, 24.2. $C_{11}H_{10}O_2N_4$ requires C, 57.5; H, 4.35; N, 24.35%.)

EXAMPLE 11

2-(4-nitrosalicylamido)-4:6-dimethyl pyrimidine 96 gm. of dry 4-nitro acetyl salicyl chloride (0.4 mol.) is added to a solution of 49 gm. of 2-amino-4:6-dimethyl pyrimidine (0.4 mol.) in 100 cc. of pyridine keeping the temperature below 25° C. After standing for 2 hours, the mixture is heated on the steam bath for ½ hour, allowed to stand overnight and then diluted with water. The brown precipitate is collected, dissolved in 3.5 litres of water and 160 cc. of 5 N. sodium hydroxide and the solution, after standing for 2 hours, acidified to pH 5.0 with dilute hydrochloric acid. The yellow, crystalline precipitate is separated, washed with water and dried in vacuo. The yield is 70 g. (60.5%) M. P. 226–229° C. The compound is purified by dissolving in N/50 sodium hydroxide solution, filtering (charcoal) and acidifying with dilute acetic acid when it is obtained in small, pale yellow needles. M. P. 230–231° C. (Found: N, 19.4. $C_{13}H_{12}O_4N_4$ requires N, 19.4%.)

2-(4-aminosalicylamido)-4:6-dimethyl pyrimidine 20 gm. of the crude nitro compound (0.07 mol.) is suspended in 400 cc. of alcohol, 100 cc. of water and 10 cc. of 5 N. sodium hydroxide and reduced with hydrogen over Raney nickel (10 g.). The hydrogen uptake was 4600 c. c.; the theoretical uptake is 4700 c. c. After filtration, the solution is evaporated to small volume at reduced pressure, neutralised with 10 cc. of 5 N. hydrochloric acid, chilled and the precipitate collected. Recrystallisation from dilute alcohol gives the 2-(4-aminosalicylamido)-4:6-dimethyl pyrimidine in small slightly pink glistening plates (5 g.; 28%) M. P. 210–211° C. (Found: C, 59.5; H, 5.0; N, 21.3. $C_{13}H_{14}O_4N_4$ requires C, 60.4; H, 5.44; N, 21.7%.)

We claim:
1. 2-(4'-aminosalicylamido) pyridine.
2. 2-(4'-aminosalicylamido) thiazole.
3. 2-(4'-aminosalicylamido) pyrazine.
4. 2-(4'-aminosalicylamido) pyrimidine.
5. 2-(4'-aminosalicylamido)-5-methyl-1.3.4-thiazole.
6. A substituted 4-aminohydroxybenzamide having the general formula

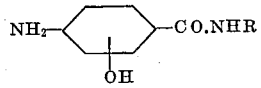

in which R is a monocyclic heterocyclic radical selected from the group consisting of pyridyl-(2)-; thiazyl-(2)-; 4-alkylthiazyl-(2); pyrimidyl-(2)-; 4.6-dialkylpyrimidyl-(2)-; pyrazyl-(2)-; 1.3.4-thiadiazyl-(2) and 5-alkyl-1.3.4-thiadiazyl-(2), each of said alkyl groups being a lower alkyl group.

7. A process for producing a 4-aminohydroxybenzamide having the general formula

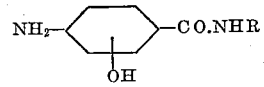

in which R is a monocyclic heterocyclic radical selected from the group consisting of pyridyl-(2)-; thiazyl-(2)-; 4-alkylthiazyl-(2)-; pyrimidyl-(2)-; 4.6-dialkylpyrimidyl-(2)-; pyrazyl-(2)-; 1.3.4-thiadiazyl-(2)- and 5-alkyl-1.3.4-thiadiazyl-(2)-, each of said alkyl groups being a lower alkyl group, by reducing a substituted 4-nitrosalicylamide having the general formula

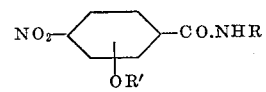

in which R is as above defined and R' is selected from the group consisting of hydrogen and alkali metals under substantially neutral conditions and, when R' is an alkyl metal, acidifying the product.

8. The process according to claim 7 in which the reduction is catalytic and is carried out in the presence of Raney nickel.

ALAN AUGUST GOLDBERG.
HAROLD AUGUSTUS WALKER.

REFERENCES CITED

The following references are of record in the file of this patent:

Schmelkes et al.: J. Am. Chem. Soc. 66, 1631–1632 (1944).